United States Patent
Takami et al.

(10) Patent No.: US 9,431,933 B2
(45) Date of Patent: Aug. 30, 2016

(54) INVERTER APPARATUS

(71) Applicant: KABUSHIKI KAISHA TOYOTA JIDOSHOKKI, Kariya-shi, Aichi-ken (JP)

(72) Inventors: Tomohiro Takami, Kariya (JP); Yoshiki Nagata, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/601,683

(22) Filed: Jan. 21, 2015

(65) Prior Publication Data

US 2015/0207438 A1    Jul. 23, 2015

(30) Foreign Application Priority Data

Jan. 22, 2014    (JP) ................. 2014-009667

(51) Int. Cl.
*H02P 6/06*    (2006.01)
*H02P 6/00*    (2016.01)
H02P 6/16    (2016.01)
(Continued)

(52) U.S. Cl.
CPC ............. *H02P 6/002* (2013.01); *H02P 6/06* (2013.01); *H02P 6/08* (2013.01); *H02P 6/16* (2013.01); *H02P 6/182* (2013.01)

(58) Field of Classification Search
CPC ............ H02P 6/182; H02P 6/06; H02P 6/16; H02P 6/08; H02P 6/14
USPC .................................................... 318/400.06
See application file for complete search history.

(56) References Cited

U.S. PATENT DOCUMENTS

| 6,324,038 | B1 | 11/2001 | Kishibe et al. | |
|---|---|---|---|---|
| 2012/0235611 | A1* | 9/2012 | Kuwabara | H02M 7/53873 318/400.17 |
| 2013/0038257 | A1* | 2/2013 | Sato | H02P 6/12 318/400.22 |

FOREIGN PATENT DOCUMENTS

| JP | 2000-287493 A | 10/2000 |
|---|---|---|
| JP | 2010-268629 A | 11/2010 |
| JP | 2011-4561 A | 1/2011 |

(Continued)

OTHER PUBLICATIONS

Communication dated Nov. 17, 2015 from the Japanese Patent Office in counterpart application No. 2014-009667.

(Continued)

*Primary Examiner* — Kawing Chan
*Assistant Examiner* — Bradley Brown
(74) *Attorney, Agent, or Firm* — Sughrue Mion, PLLC

(57) ABSTRACT

Provided is an inverter apparatus capable of preventing occurrence of overcurrent in an AC motor and stably controlling driving of the AC motor. The inverter apparatus controlling the AC motor included in an electric compressor includes a shunt resistor for detecting current flowing in the AC motor, and a limit value control unit controlling a current limit value for a detected current detected at the shunt resistor. The limit value control unit determines whether the number of times the detected current becomes equal to or more than the first threshold within a first predetermined time is equal to or more than a first number of times. The limit value control unit decreases the current limit value when the number of times the detected current becomes equal to or more than the first threshold within the first predetermined time is equal to or more than the first number of times.

4 Claims, 7 Drawing Sheets

(51) Int. Cl.
*H02P 6/18* (2016.01)
*H02P 6/08* (2016.01)

(56) References Cited

FOREIGN PATENT DOCUMENTS

JP         2012200042 A    10/2012
JP         5158290 B2       3/2013
WO         2012/164690 A1  12/2012

OTHER PUBLICATIONS

Communication dated May 20, 2016, issued by the Korean Intellectual Property Office in counterpart Korean Application No. 10-2015-0007272.

* cited by examiner

INVERTER APPARATUS

This nonprovisional application is based on Japanese Patent Application No. 2014-009667 filed on Jan. 22, 2014 with the Japan Patent Office, the entire contents of which are hereby incorporated by reference.

BACKGROUND OF THE INVENTION

1. Field of the Invention

The present disclosure relates to an inverter apparatus, and particularly relates to an inverter apparatus for controlling an AC motor included in an electric compressor.

2. Description of the Background Art

An electric compressor mounted on a vehicle such as hybrid vehicle, electric vehicle, or fuel cell vehicle includes an inverter for controlling a motor which drives the compressor. Such an inverter controls the rotational speed of the motor by controlling an output current thereof, using a high-frequency switching operation of switching elements.

For example, Japanese Patent Laying-Open No. 2010-268629 discloses an inverter apparatus performing vector control of an AC motor. The inverter apparatus detects current flowing in the AC motor, performs PWM control of switching elements provided in a current path of the AC motor so that an excitation component current and a torque component current of the AC motor that are obtained from the detected current are each a target value, and estimates an input current from the detected current and a duty ratio for the PWM control of the switching elements.

SUMMARY OF THE INVENTION

When an output of current flowing in a motor which is used for an electric compressor is increased, the operating range of the electric compressor is increased. An influence of discharge pulsation, however, is also increased, and thus overcurrent is likely to occur in the motor. Particularly in the case where the compressor is operated under a low-speed high-load condition, the influence of discharge pulsation is greater, which accordingly causes a situation where overcurrent is more likely to occur.

The present disclosure is made to solve the above-described problem, and an object in an aspect is to provide an inverter apparatus capable of preventing an occurrence of overcurrent in an AC motor and stably controlling driving of the AC motor.

According to an embodiment, an inverter apparatus controlling an AC motor included in an electric compressor is provided. The inverter apparatus includes a current detection unit configured to detect current flowing in the AC motor, and a limit value control unit configured to control a current limit value for a detected current detected by the current detection unit. The limit value control unit is configured to compare the detected current and a first threshold, and determine whether a number of times the detected current becomes equal to or more than the first threshold within a first predetermined time is equal to or more than a first number of times. The limit value control unit is configured to decrease the current limit value when the number of times the detected current becomes equal to or more than the first threshold within the first predetermined time is equal to or more than the first number of times.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
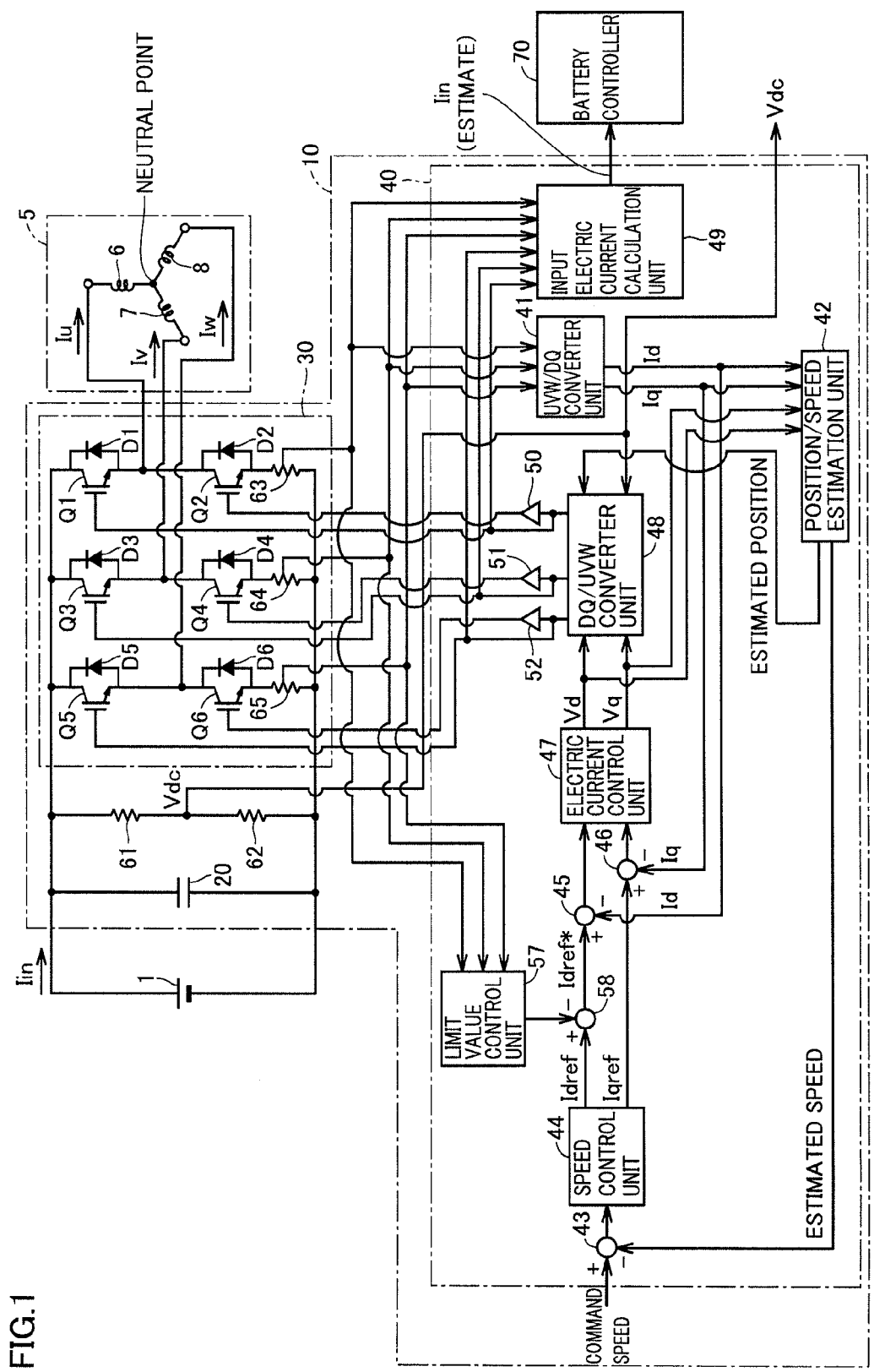
FIG. 1 is a circuit diagram showing a configuration of an electric compressor according to the present embodiment.

The following describes the present embodiment in detail with reference to figures. It should be noted that the same or corresponding portions in the figures are given the same reference characters and explanations thereof are not repeated.

<Entire Configuration>

FIG. 1 is a circuit diagram showing an entire configuration of an electric compressor according to the present embodiment. Referring to FIG. 1, the electric compressor includes an AC motor 5, an inverter apparatus 10, a scroll compressor (not shown) driven by the AC motor 5.

The inverter apparatus 10 receives an input of power from a high voltage battery 1 which is a DC power supply and controls driving of the AC motor 5. The AC motor 5 is a three-phase synchronous motor and, for example, is used as a motor for an air conditioner of a vehicle (a motor for an air conditioner compressor).

The inverter apparatus 10 includes a capacitor 20, a switching circuit 30, and a motor control unit 40. The inverter apparatus 10 is connected to a battery controller 70.

A positive electrode terminal of the high voltage battery 1 is connected to one terminal of the capacitor 20 and a positive electrode power line of the switching circuit 30. A negative electrode terminal of the high voltage battery 1 is connected to the other terminal of the capacitor 20 and a negative electrode power line of the switching circuit 30. The switching circuit 30 is supplied with a DC power from the high voltage battery 1 via the capacitor 20.

The switching circuit 30 includes switching elements Q1 to Q6, diodes D1 to D6, and shunt resistors 63 to 65. Examples of the switching elements Q1 to Q6 used herein include an IGBT (Insulated Gate Bipolar Transistor). The switching elements Q1, Q2 for U phase and the shunt resistor 63 are connected in series between the positive electrode power line and the negative electrode power line. The switching elements Q3, Q4 for V phase and the shunt resistor 64 are connected in series between the positive electrode power line and the negative electrode power line. The switching elements Q5, Q6 for W phase and the shunt resistor 65 are connected in series between the positive electrode power line and the negative electrode power line. The diodes D1 to D6 are connected in anti-parallel with the switching elements Q1 to Q6, respectively. Coils 6, 7, and 8 corresponding to respective phases of the AC motor 5 are connected to a connection node of the switching elements Q1, Q2, a connection node of the switching elements Q3, Q4, and a connection node of the switching elements Q5, Q6, respectively. The coils 6, 7, and 8 are Y-connected.

Resistors 61, 62 are connected in series between the positive electrode power line and the negative electrode power line on a power source input side of the switching circuit 30. An input voltage can be detected based on a voltage Vdc of a connection node of the resistors 61, 62. A current flowing in the AC motor 5 can be detected based on voltages of the shunt resistors 63 to 65.

The motor control unit 40 vector-controls the AC motor 5. The motor control unit 40 includes a uvw/dq converter unit 41, a position/speed estimation unit 42, a subtracter 43, a speed control unit 44, subtracters 45, 46, and 58, an electric current control unit 47, a dq/uvw converter unit 48, an input electric current calculation unit 49, and a limit value control unit 57.

A command speed of the AC motor 5 is input from the outside to the subtracter 43 of the motor control unit 40. The motor control unit 40 drives the switching circuit 30 by the vector control corresponding to the command speed.

The dq/uvw converter unit 48 outputs a U phase control signal, a W phase control signal, and a V phase control signal. A gate terminal of the switching element Q1 receives the U phase control signal from the dq/uvw converter unit 48. A gate terminal of the switching element Q2 receives an inverted signal of the U phase control signal output from an inverter 50.

A gate terminal of the switching element Q3 receives the V phase control signal from the dq/uvw converter unit 48. A gate terminal of the switching element Q4 receives an inverted signal of the V phase control signal output from an inverter 51.

A gate terminal of the switching element Q5 receives the W phase control signal from the dq/uvw converter unit 48. A gate terminal of the switching element Q6 receives an inverted signal of the W phase control signal output from an inverter 52.

The uvw/dq converter unit 41 calculates an excitation component current Id and a torque component current Iq by converting current values detected at the shunt resistors 63 to 65 into a d-axis coordinate and a q-axis coordinate on a rotor shaft of the AC motor 5. The calculated excitation component current Id and the calculated torque component current Iq are input to the position/speed estimation unit 42. The calculated excitation component current Id is also input to the subtracter 45. The calculated torque component current Iq is also input to the subtracter 46.

The position/speed estimation unit 42 calculates a rotor estimation speed and a rotor estimation position of the AC motor 5 based on the excitation component current Id, the torque component current Iq, an excitation component voltage Vd, and a torque component voltage Vq. The calculated rotor estimation speed is input to the subtracter 43. The calculated rotor estimation position is input to the dq/uvw converter unit 48.

The subtracter 43 subtracts the rotor estimation speed from the command speed. The speed control unit 44 receives a difference between the command speed and the estimated speed from the subtracter 43, and calculates a limit value Idref for the excitation component current Id and a limit value Iqref for the torque component current Iq. The limit value Idref for the excitation component current Id is input to the subtracter 58. The limit value Iqref for the torque component current Iq is input to the subtracter 46.

Based on the current values detected at the shunt resistors 63 to 65, the limit value control unit 57 controls a current limit value for the detected currents. In an aspect, the limit value control unit 57 performs control to decrease the limit value Idref based on a result of comparison between the detected current and a threshold A. Specifically, the limit value control unit 57 counts the number of times the detected current becomes equal to or more than the threshold A within a predetermined time Ta (e.g., 4 ms) and determines whether the number of times is equal to or more than Na. When the number of times the detected current becomes equal to or more than the threshold A within the predetermined time Ta is equal to or more than Na, the limit value control unit 57 inputs a value for decreasing the limit value Idref to the subtracter 58. Limit value control like this is performed for preventing an occurrence of overcurrent in the AC motor 5. Details are described later. It should be noted that the limit value control unit 57 inputs a value (zero) for maintaining the limit value Idref to the subtracter 58 when the number of times is less than Na.

In another aspect, the limit value control unit 57 compares the detected current and a threshold B. The limit value control unit 57 counts the number of times the detected current becomes equal to or more than the threshold B within a predetermined time Tb (e.g., 60 to 70 ms) longer than the predetermined time Ta. The limit value control unit 57 determines whether the number of times is equal to or less than Nb. When the number of times the detected current becomes equal to or more than the threshold B within the predetermined time Tb is equal to or less than Nb, the limit value control unit 57 inputs a value for increasing the decreased limit value Idref to the subtracter 58. Limit value control like this is performed for returning a decreased current of the AC motor 5 to a former state (state before decreased).

In this way, the limit value control unit 57 basically performs control to increase or decrease the limit value Idref for the excitation component current Id and performs control to maintain the limit value Iqref for the torque component current Iq. Such control is performed to maintain a torque of the AC motor 5 and to decrease an output current.

The subtracter 58 subtracts a value input by the limit value control unit 57 from the limit value Idref. This subtraction result is input to the subtracter 45.

The subtracter 45 subtracts the excitation component current Td from a limit value Idref* determined by the above subtraction (hereinafter simply referred to as "limit value Idref*"). This subtraction result is input to the electric current control unit 47. The subtracter 46 also subtracts the torque component current Iq from the limit value Iqref. This subtraction result is input to the electric current control unit 47.

The electric current control unit 47 calculates, based on the difference between the limit value Idref* and the excitation component current Id, the excitation component voltage Vd which is a result of conversion into a d-axis coordinate on the rotor shaft of the AC motor 5. This excitation component voltage Vd is input to the dq/uvw converter unit 48 and the position/speed estimation unit 42. The electric current control unit 47 also calculates, based on the difference between the limit value Iqref and the torque component current Iq, the torque component voltage Vq which is a result of conversion into a q-axis coordinate on the rotor shaft of the AC motor 5. This torque component voltage Vq is input to the dq/uvw converter unit 48 and the position/speed estimation unit 42.

A voltage Vdc generated by voltage division by the resistors 61, 62 is input to the dq/uvw converter unit 48. The dq/uvw converter unit 48 calculates driving voltages Vu, Vv, and Vw corresponding to the respective phase coils 6, 7, and 8 of the AC motor 5 based on the rotor estimation position, the excitation component voltage Vd, the torque component voltage Vq and the voltage Vdc which are input to the dq/uvw converter unit 48. The dq/uvw converter unit 48 generates driving waveform signals (PWM signals) required to obtain the driving voltages Vu, Vv, and Vw. Each of the switching elements Q1 to Q6 of the switching circuit 30 is driven on/off by the driving waveform signal.

Thus, in the present embodiment, the motor control unit 40 performs PWM control of the switching elements Q1 to Q6 provided in a current path of the AC motor 5 so that the excitation component current and the torque component current in the AC motor 5 each become a limit value thereof. The excitation component current and the torque component current are obtained from the current detected at the shunt resistors 63 to 65.

The motor control unit 40 performs control for an initial driving operation until a rotational speed of the rotor reaches a predetermined speed or more. The motor control unit 40 performs control for a sensorless operation after the rotational speed of the rotor reaches the predetermined speed or more. The sensorless operation is an operation for rotating the motor based on each of estimation values of the rotor position and the rotor rotational speed. Each of the estimation values is estimated from motor current and the like, without a rotational speed sensor such as a resolver and the like detecting a rotor position of a motor. In the control for the sensorless operation, a closed-loop speed control is performed with the position/speed estimation unit 42 and the speed control unit 44.

According to the above-mentioned configuration, the switching elements Q1 to Q6 of the switching circuit 30 are controlled based on the command speed, and a DC current is converted into three-phase AC currents. The three-phase AC currents generated by conversion by the switching circuit 30 are supplied to the respective phase coils 6, 7, and 8 in the AC motor 5. The AC motor 5 for the air conditioner is driven by these three-phase AC currents.

It should be noted that the switching circuit 30 is connected to the high voltage battery (DC power supply) 1 in FIG. 1. Alternatively, an AC voltage of an AC power supply may be converted into a DC voltage and the DC voltage may be supplied to the switching circuit 30.

The shunt resistors 63 to 65 are used for current detection units. Alternatively, a current transformer may be used instead of the shunt resistor.

<Control Scheme for Limit Values>

Next, a control scheme for the limit values will be described. In the following, a description will be given of the case where the AC motor 5 is used as a motor which is used for an electric compressor of an air conditioner.

Figure 2:
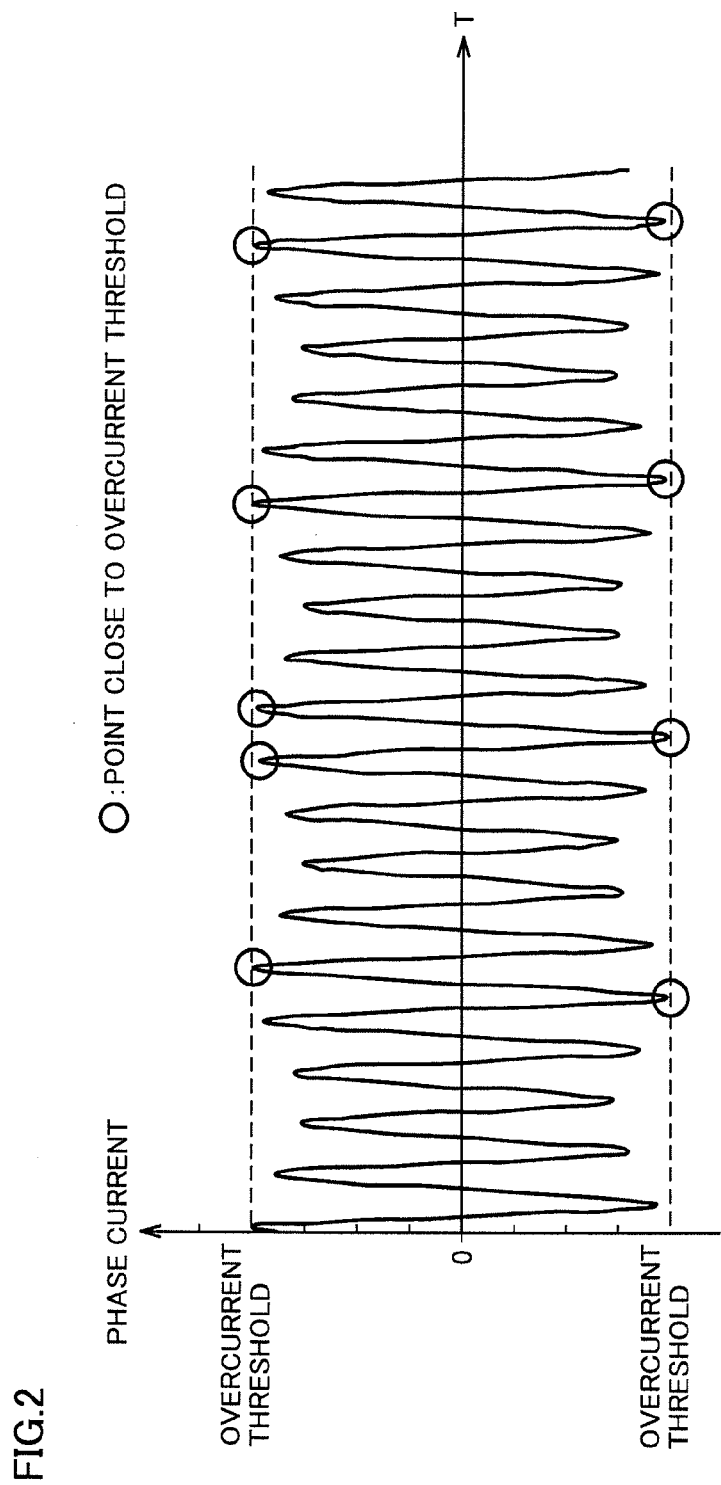
FIG. 2 is an example waveform chart of a phase current.

FIG. 2 is an example waveform chart of a phase current. Specifically, FIG. 2 exemplarily shows a phase current which is any one of U phase current, V phase current, and W phase current of the AC motor 5.

Referring to FIG. 2, it is seen that there periodically appear points at which the value of the current becomes close to an overcurrent threshold which is given for detecting an occurrence of overcurrent. This is for the reason that an increase of the influence of discharge pulsation of the compressor causes an increase of the UVW phase current (an occurrence of current ripple) for every one revolution in terms of mechanical angle of the AC motor 5. The discharge pulsation is particularly likely to occur under a condition that the motor rotates at a low speed (3000 rpm for example) and a load on the motor is high (low-speed high-load condition). The low-speed high-load condition is for example a condition in which the voltage of the high voltage battery 1 has become low.

When the value of the current becomes the overcurrent threshold or more, the AC motor 5 is forced to be stopped by the motor control unit 40 for protecting the switching elements Q1 to Q6. Therefore, if this state continues, it is difficult to stably and continuously drive the AC motor 5.

Accordingly, in the present embodiment, the limit value control unit 57 monitors all the time the motor current (detected current) which is detected at the shunt resistors 63 to 65, and performs control for decreasing the motor current when there is a (high) possibility that the overcurrent occurs. When there is no (low) possibility that the overcurrent occurs, the limit value control unit 57 performs control for returning the decreased motor current toward a former motor current.

Figure 3:
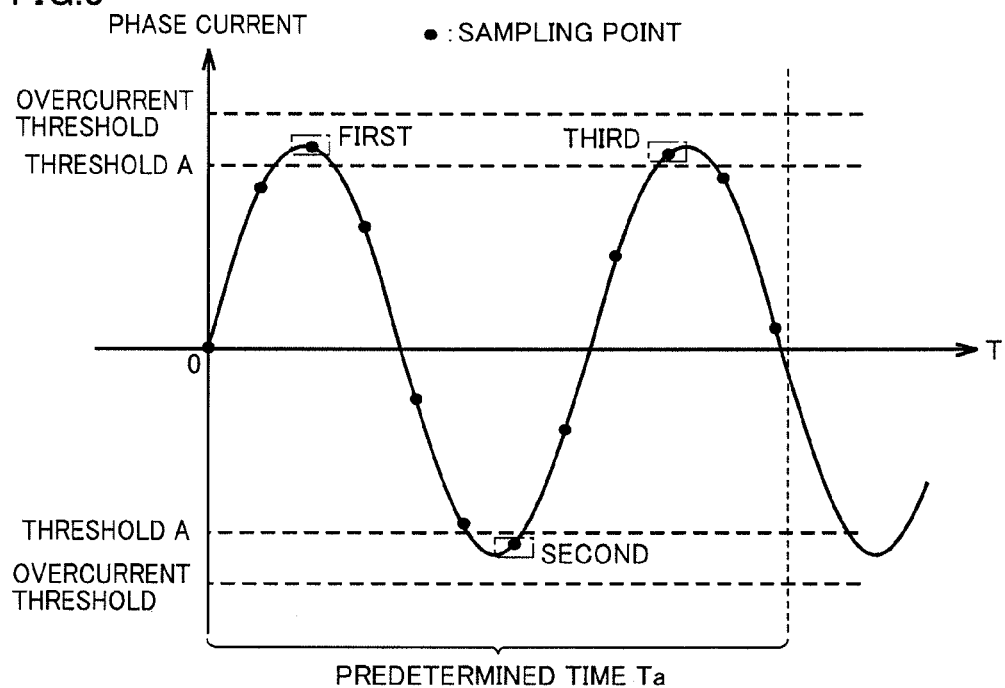
FIG. 3 is a diagram for illustrating a (first) determination scheme for a limit value control unit.
Figure 4:
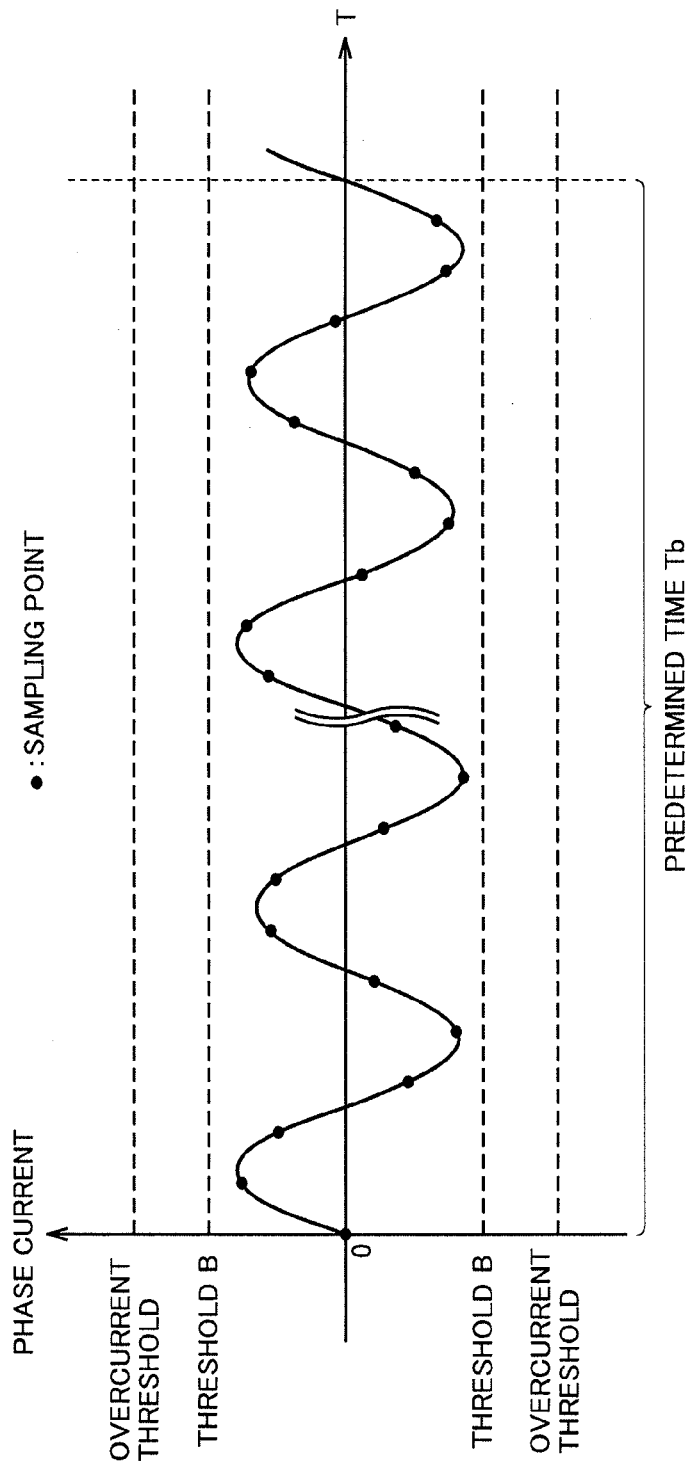
FIG. 4 is a diagram for illustrating a (second) determination scheme for the limit value control unit.
Figure 5:
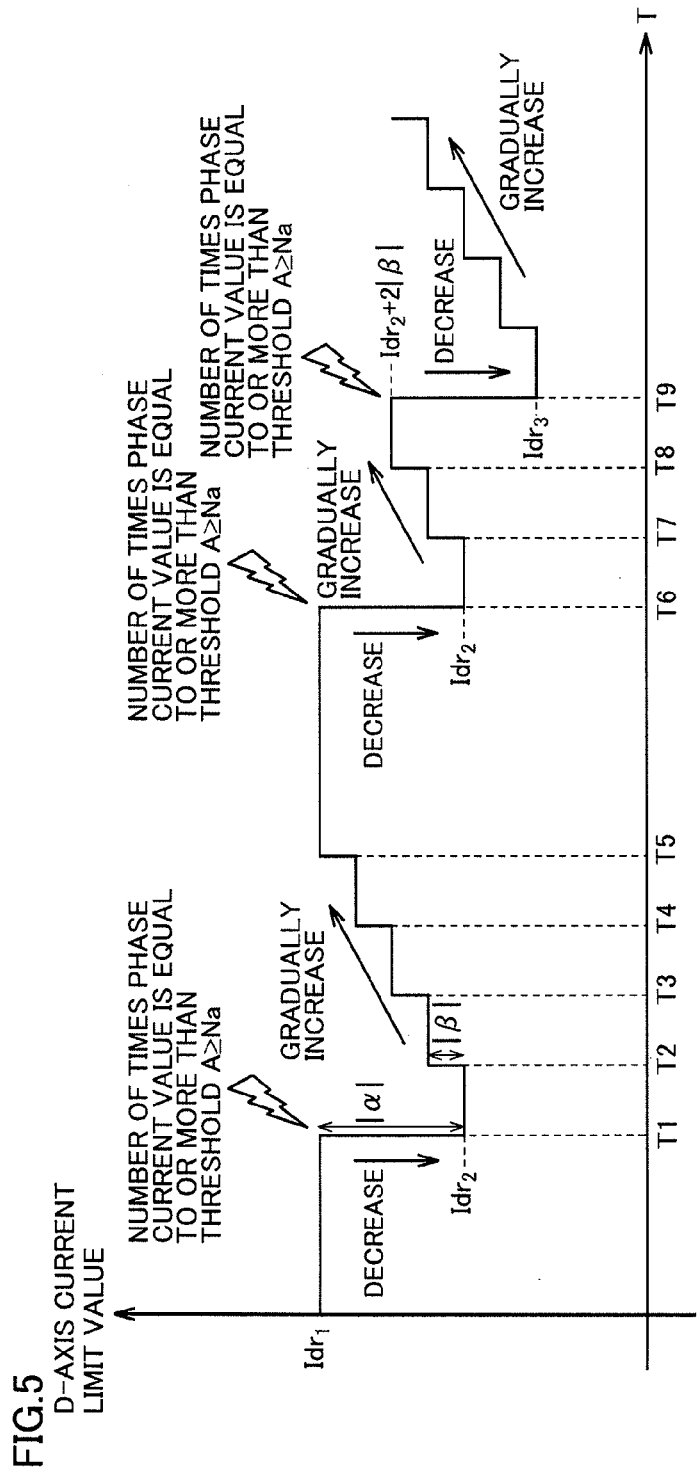
FIG. 5 is a diagram showing a specific example of a change of a current limit value with time T.

With reference to FIGS. 3 to 5, the control scheme for the limit value control unit 57 will more specifically be described. FIG. 3 is a diagram for illustrating a (first) determination scheme for the limit value control unit 57. FIG. 4 is a diagram for illustrating a (second) determination scheme for the limit value control unit 57. FIG. 5 is a diagram showing a specific example of a change of a current limit value with time T. It should be noted that FIGS. 3 and 4 each exemplarily show a waveform chart of a phase current which is any one of U phase current, V phase current, and W phase current, like FIG. 2.

Referring first to FIG. 3, a description will be given of the scheme for determination which is made by the limit value control unit 57 to avoid an occurrence of overcurrent. Solid black points in FIG. 3 are sampling points obtained by discretizing (A/D converting) the electric current value which is an analogue value. As shown in FIG. 3, it is seen that the number of times (an absolute value of) a phase current value becomes equal to or more than a threshold A (threshold A>0) within a predetermined time Ta (4 ms for example) is three. The limit value control unit 57 determines whether or not the number of times (three) is equal to or more than a predetermined number of times Na (Na≥1). For example, in the case where the predetermined number of times Na is set to three in the example of FIG. 3, the limit value control unit 57 determines that the number of times the phase current value becomes equal to or more than the threshold A within the predetermined time Ta is equal to or more than the predetermined number of times Na. In this case, the limit value control unit 57 determines that the present state of the AC motor 5 is a state where there is a possibility of an occurrence of overcurrent, and performs control for decreasing the limit value Idref.

The threshold A and the predetermined number of times Na are determined in advance or appropriately determined by a user. When the threshold A is set smaller and the predetermined number of times Na is set smaller, it is more strictly determined whether or not the possibility of an occurrence of overcurrent is high. Therefore, in the case where a more strict determination is to be made, the threshold A and the predetermined number of times Na are set smaller. It should be noted that, in the case where the predetermined number of times Na is set to one, it is unavoidably determined that there is a high possibility of an occurrence of overcurrent even when it is noise that causes the electric current value to become equal to or more than the threshold A. It is accordingly preferable that the predetermined number of times Na is two or more.

Referring next to FIG. 4, a description will be given of the scheme for determination which is made by the limit value control unit 57 to return the decreased limit value Idref toward a former limit value. Solid black points in FIG. 4 are sampling points obtained by discretizing (A/D converting) the electric current value which is an analogue value. As shown in FIG. 4, it is seen that the number of times (an absolute value of) a phase current value becomes equal to or more than a threshold B (threshold B>0) within a predetermined time Tb is zero. The limit value control unit 57 determines whether or not the number of times (zero) is equal to or less than a predetermined number of times Nb (Nb≥0). For example, in the case where the predetermined number of times Nb is set to zero in the example of FIG. 4, the limit value control unit 57 determines that the number of times the phase current value becomes equal to or more than the threshold B within the predetermined time Tb is equal to or less than the predetermined number of times Nb. In this case, the limit value control unit 57 determines that the present state of the AC motor 5 is a state where there is a low possibility of an occurrence of overcurrent, and returns (increases) the decreased limit value Idref toward a former limit value.

The threshold B and the predetermined number of times Nb are determined in advance or appropriately determined by a user. When the threshold B and the predetermined number of times Nb are set smaller, it is more strictly determined whether or not the possibility of an occurrence of overcurrent is high. Therefore, in the case where a more strict determination is to be made, the threshold B and the predetermined number of times Nb are set smaller. On the contrary, in the case where more importance is placed on an earlier return of the limit value to a normal limit value, the threshold B and the predetermined number of times Nb are set larger. The threshold B is set equal to or less than the threshold A.

In addition, because the UVW phase current tends to increase for every one revolution in terms of mechanical angle of the AC motor 5 due to the influence of discharge pulsation of the compressor, it is preferable that the predetermined time Tb is not shorter than the time taken for the AC motor 5 to make one revolution in terms of mechanical angle. For example, the predetermined time Tb is 60 ms to 70 ms. Thus, the current limit value is returned toward a former current limit value in consideration of the influence of the periodic increase of electric current which varies for every aforementioned predetermined time. Accordingly, the output current of the AC motor 5 will not be uselessly kept low.

Referring next to FIG. 5, a specific description will be given of how the limit value Idref is changed with time T under control of the limit value control unit 57. It is supposed herein that the value of the limit value Idref is a standard value $Idr_1$ (a value which has not been decreased under control of the limit value control unit 57) in an initial state.

The limit value control unit 57 determines at time T1 that the number of times the phase current value becomes equal to or more than the threshold A within the predetermined time Ta is equal to or more than the predetermined number of times Na, and thus the limit value control unit 57 performs control for decreasing $Idr_1$. Specifically, the limit value control unit 57 outputs $|\alpha|$ ($\alpha$ is not zero) to the subtracter 58. Accordingly, the value of the limit value Idref becomes $Idr_2$ (=$Idr_1 - |\alpha|$).

The limit value control unit 57 determines at time T2 that the number of times the phase current value becomes equal to or more than the threshold B within the predetermined time Tb is equal to or less than the predetermined number of times Nb, and thus the limit value control unit 57 performs control for increasing $Idr_2$. Specifically, the limit value control unit 57 outputs $|\alpha| - |\beta|$ ($|\alpha| > |\beta|$, $\beta$ is not zero) to the subtracter 58. Accordingly, the value of the limit value Idref becomes $Idr_2 + |\beta|$ (=$Idr_1 - |\alpha| + |\beta|$). At time T3, time T4, and time T5 as well, similar control is performed and accordingly the value of the limit value Idref is gradually increased and the value of the limit value Idref returns, at time T5, to $Idr_1$ which is the standard value.

The limit value control unit 57 determines at time T6 that the number of times the phase current value becomes equal to or more than the threshold A within the predetermined time Ta is equal to or more than the predetermined number of times Na, and thus the limit value control unit 57 performs control for decreasing the value ($Idr_1$) of the limit value Idref. At time T7 and time T8, the limit value control unit 57 determines that the number of times the phase current value becomes equal to or more than the threshold B within the predetermined time Tb is equal to or less than the predetermined number of times Nb, and thus the limit value control unit 57 performs control for increasing the value of the limit value Idref. Then, the value of the limit value Idref is returned to $Idr_2 + 2|\beta|$ (=$Idr_1 - |\alpha| + 2|\beta|$).

The limit value control unit 57 determines at time T9 that the number of times the phase current value becomes equal to or more than the threshold A within the predetermined time Ta is equal to or more than the predetermined number of times Na, and thus the limit value control unit 57 performs control for decreasing the value ($Idr_2 + 2|\beta|$) of the limit value Idref. Accordingly, the value of the limit value Idref becomes $Idr_3$ (=$Idr_2 - |\alpha| + 2|\beta| = Idr_1 - 2|\alpha| + 2|\beta|$). Thus, in the case where it is determined that the number of times the phase current value becomes equal to or more than the threshold A within the predetermined time Ta is equal to or more than the predetermined number of times Na before the limit value Idref is returned to the standard value ($Idr_1$), the value of the limit value Idref is a value which is still smaller than $Idr_2$. At time T9 and thereafter, the limit value control unit 57 performs control for gradually increasing the value of the limit value Idref.

In the example of FIG. 5, the amount of decrease (absolute value of $\alpha$) of the limit value Idref is set larger than the amount of increase (absolute value of $\beta$) (the amount of increase is one third of the amount of decrease). Therefore, the limit value control unit 57 controls the current limit value so that the amount of increase by which the decreased limit value is increased is smaller than the amount of decrease by which the current limit value is decreased. Namely, in the case where there is a high possibility of an occurrence of overcurrent, the limit value control unit 57 decreases the limit value Idref by a large amount and, in the case where there is a low possibility of an occurrence of overcurrent, the limit value control unit 57 gradually increases the decreased limit value Idref. In this way, a state where there is a low possibility of an occurrence of overcurrent in the AC motor 5 while the output current of the AC motor 5 is as large as possible can appropriately be found.

<Process Procedure>

Figure 6:
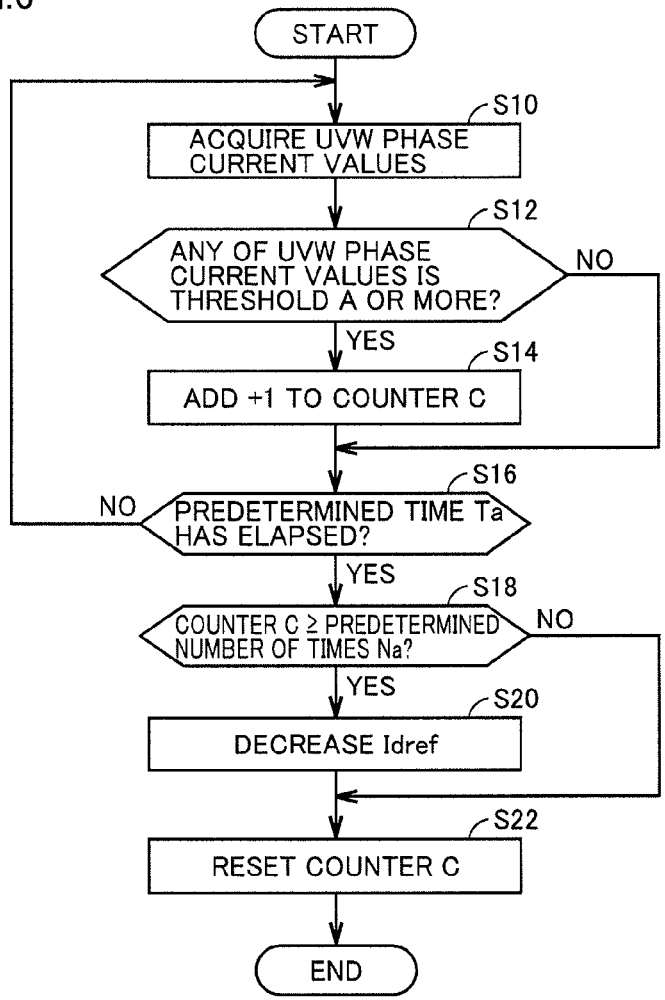
FIG. 6 is a flowchart showing a process followed when the current limit value is decreased.

Next, process procedures which are followed when the limit value Idref is decreased and increased will be described. FIG. 6 is a flowchart showing a process followed when the limit value Idref is decreased. This process is executed for every predetermined control period.

Referring to FIG. 6, the limit value control unit 57 acquires electric current values of U phase, V phase, and W phase that are detected at the shunt resistors 63 to 65 respectively (step S10).

The limit value control unit 57 determines whether or not any of the U, V, and W phase current values is equal to or more than the threshold A (step S12). When it is not equal to or more than the threshold A (NO in step S12), the limit value control unit 57 performs step S16. In contrast, when it is equal to or more than the threshold A (YES in step S12), the limit value control unit 57 adds +1 to the value of a counter C (step S14) and determines whether or not the predetermined time Ta has elapsed since the start of this process (step S16).

When the predetermined time Ta has not elapsed (NO in step S16), the limit value control unit 57 repeats the process from step S10. When the predetermined time Ta has elapsed (YES in step S16), the limit value control unit 57 determines whether or not the value of the counter C is equal to or more than the predetermined number of times Na (step S18).

When the value of the counter C is equal to or more than the predetermined number of times Na (YES in step S18), the limit value control unit 57 performs control for decreasing the limit value Idref (step S20), resets the value of the counter C (step S22), and then ends the process. In contrast, when the value of the counter C is less than the predetermined number of times Na (NO in step S18), the limit value control unit 57 resets the value of the counter C (step S22) and then ends the process.

When two or more of the U, V, and W phase current values are equal to or more than the threshold A in the above-described step S12, the counter C may be incremented by a value corresponding to the number of the phase current values that are equal to or more than the threshold A. For example, when two current values of the U, V, and W phase current values are equal to or more than the threshold A, +2 is added to the value of the counter C and, when the three phase current values are equal to or more than the threshold A, +3 is added to the value of the counter C.

Figure 7:
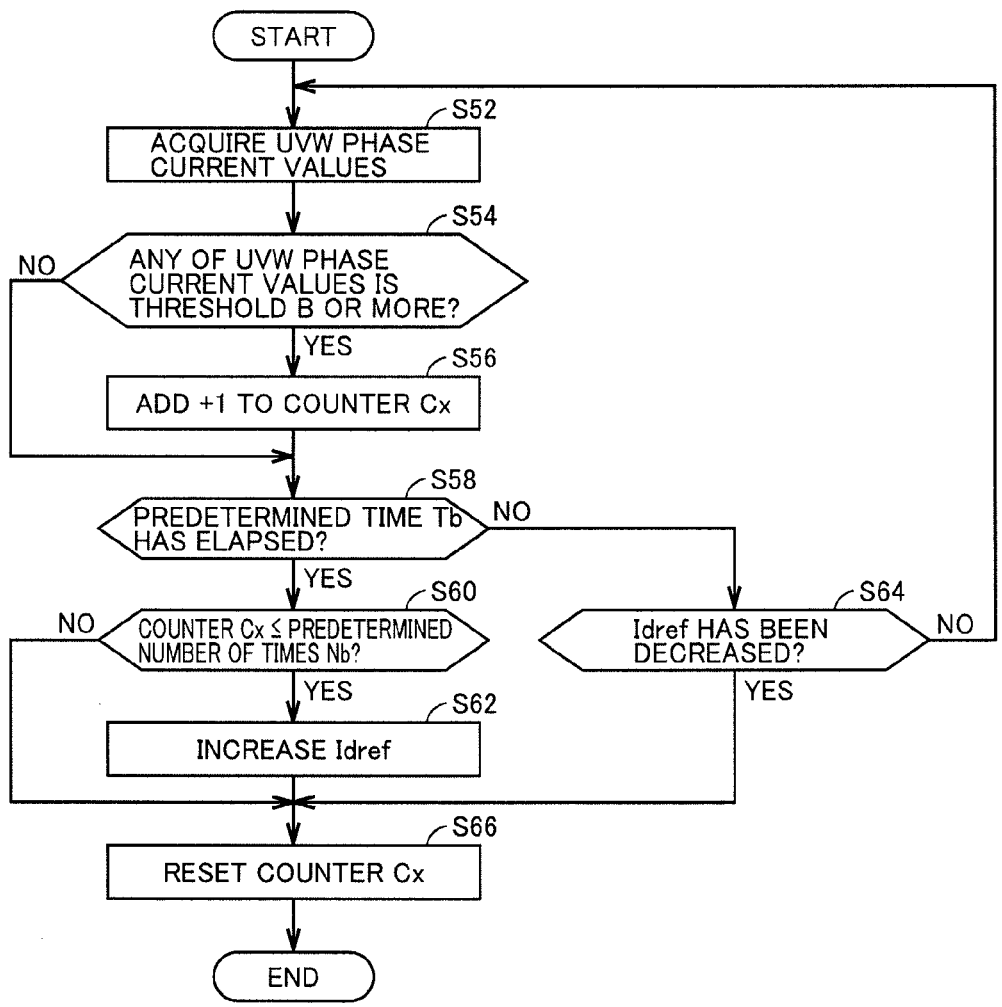
FIG. 7 is a flowchart showing a process followed when the current limit value is returned toward a former current limit value.

FIG. 7 is a flowchart showing a process followed when the limit value Idref is returned (increased). The process for returning the limit value Idref is executed for returning the limit value Idref toward a standard value, in the case where the limit value Idref has been decreased from the standard value.

Thus, when the limit value control unit 57 determines that the limit value Idref is less than the standard value, the limit value control unit 57 performs the process shown in FIG. 7. For example, when the limit value Idref has not been decreased in the past, the limit value control unit 57 can determine that the limit value Idref is the standard value. When the limit value Idref has been decreased in the past, the limit value control unit 57 can determine, depending on whether or not the limit value has been returned to the standard value, whether or not the limit value Idref is less than the standard value. The limit value control unit 57 may acquire the present limit value Idref from the speed control unit 44 and make this determination.

Referring to FIG. 7, the limit value control unit 57 acquires electric current values of U phase, V phase, and W phase that are detected at the shunt resistors 63 to 65 respectively (step S52).

The limit value control unit 57 determines whether or not any of the U, V, and W phase current values is equal to or more than the threshold B (step S54). When any of these current values is not equal to or more than the threshold B (NO in step S54), the limit value control unit 57 performs step S58. In contrast, when any of these current values is equal to or more than the threshold B (YES in step S54), the limit value control unit 57 adds +1 to the value of a counter Cx (step S56), and determines whether or not the predetermined time Tb has elapsed since the start of this process (step S58).

When the predetermined time Tb has not elapsed (NO in step S58), the limit value control unit 57 determines whether or not it has performed control for decreasing the limit value Idref within the predetermined time Tb as shown in FIG. 6 (step S64). When the limit value control unit 57 has not performed this control (NO in step S64), the limit value control unit 57 repeats the process from step S52. In contrast, when the limit value control unit 57 has performed this control (YES in step S64), it resets the value of the counter Cx (step S66) and then ends the process.

When the predetermined time Tb has elapsed (YES in step S58), the limit value control unit 57 determines whether or not the value of the counter Cx is equal to or less than the predetermined number of times Nb (step S60). When the value of the counter Cx is equal to or less than the predetermined number of times Nb (YES in step S60), the limit value control unit 57 performs control for increasing the decreased limit value Idref (step S62), resets the value of the counter Cx (step S66), and then ends the process. In contrast, when the value of the counter Cx is not equal to or less than the predetermined number of times Nb (NO in step S60), the limit value control unit 57 resets the value of the counter Cx (step S66) and ends the process.

When two or more of the U, V, and W phase current values are equal to or more than the threshold B in the above-described step S54, the counter Cx may be incremented by a value corresponding to the number of the phase current values that are equal to or more than the threshold B.

Regarding the above-described embodiment, the given description is of the case where the limit value control unit 57 performs control for increasing/decreasing the limit value Idref and keeps the limit value Iqref for the torque component current Iq as it is. The embodiment, however, is not limited to this. Namely, the limit value Iqref may also be increased/decreased under similar control to the above-described control scheme for the limit value Idref.

<Effects of the Embodiment>

According to the present embodiment, an occurrence of overcurrent in the AC motor is reliably avoided. Accordingly, the AC motor can be protected and can also be operated stably.

In the case where there is a possibility of an occurrence of overcurrent, the limit value Idref for the excitation component current Id is decreased while the limit value Iqref for the torque component current Iq is maintained. Accordingly, the torque of the AC motor can be maintained.

In the case where there is no possibility of an occurrence of overcurrent, the limit value Idref is increased (returned). Accordingly, the output current of the AC motor will not be uselessly kept low.

Further, the predetermined time Tb is set to a time which is not shorter than a time taken for the AC motor to make one revolution in terms of mechanical angle, to thereby enable the output current of the AC motor to be precisely adjusted, since the current of the AC motor is returned toward a former current in consideration of the influence of the periodic increase of electric current due to discharge pulsation of the compressor.

Further, control is performed so that an amount of increase by which the current limit value is increased is smaller than an amount of decrease by which the current limit value is decreased, to thereby enable the current limit value to be appropriately set depending on the state of the AC motor.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An inverter apparatus for controlling an AC motor included in an electric compressor, comprising:
    a current detection unit configured to detect current flowing in the AC motor; and
    a limit value control unit configured to control a current limit value for a detected current detected by the current detection unit,
    the limit value control unit configured to:
        compare the detected current and a first threshold, and count a number of times that the detected current becomes greater than or equal to the first threshold within a first predetermined time;
        decrease the current limit value when the counted number of times that the detected current becomes greater than or equal to the first threshold within the first predetermined time is greater than or equal to a first number of times;
        compare the detected current and a second threshold, and count a number of times that the detected current becomes greater than or equal to the second threshold within a second predetermined time longer than the first predetermined time; and
        increase the current limit value when the counted number of times that the detected current becomes greater than or equal to the second threshold within the second predetermined time is less than or equal to the a second number of times.

2. The inverter apparatus according to claim 1, wherein
    the current limit value includes a limit value for a torque component current obtained from the detected current and a limit value for an excitation component current obtained from the detected current; and
    the limit value control unit is configured to maintain the limit value for the torque component current and decrease the limit value for the excitation component current.

3. The inverter apparatus according to claim 1, wherein the second predetermined time is not shorter than a time taken for the AC motor to make one revolution in terms of mechanical angle of the AC motor.

4. The inverter apparatus according to claim 1, wherein the limit value control unit is configured to control the current limit value so that an amount of increase by which the current limit value is increased is less than an amount of decrease by which the current limit value is decreased.

* * * * *